United States Patent [19]

Scragg et al.

[11] 4,084,038

[45] Apr. 11, 1978

[54] ELECTRICAL POWER GENERATION AND STORAGE SYSTEM

[76] Inventors: Robert L. Scragg; Alfred B. Parker, both of 2937 SW. 27th Ave., Miami, Fla. 33133

[21] Appl. No.: 564,086

[22] Filed: Apr. 1, 1975

Related U.S. Application Data

[63] Continuation-in-part of Ser. No. 534,587, Dec. 19, 1974, abandoned.

[51] Int. Cl.$^2$ ............................................. H01M 8/06
[52] U.S. Cl. ...................................................... 429/19
[58] Field of Search ............................. 429/12, 17, 19

[56] References Cited

U.S. PATENT DOCUMENTS

| | | | |
|---|---|---|---|
| 2,384,463 | 9/1945 | Gunn et al. | 429/45 |
| 3,180,813 | 4/1965 | Wasp et al. | 429/12 |
| 3,301,709 | 1/1967 | Lindstrom | 429/17 |

*Primary Examiner*—John H. Mack
*Assistant Examiner*—H. A. Feeley
*Attorney, Agent, or Firm*—Cushman, Darby & Cushman

[57] ABSTRACT

A process is disclosed for generating and temporarily storing generated electrical power in electro-chemical, chemical and electro-mechanical mediums and for efficiently reconverting the stored energy back to usable AC electrical energy. In one embodiment of the process, alternating current is converted to direct current which is used to power a chlorine-sodium hydroxide electrolysis cell. Process steam, from a steam generating source, and fuel gas are combined in a reformer process to produce hydrogen and carbon monoxide. The carbon monoxide is then recycled with process steam to form additional hydrogen and carbon dioxide. In addition, the process steam is used to liquify air to form oxygen. The chlorine, hydrogen, carbon dioxide and oxygen gases produced by the processes, are compressed and/or stored in appropriate tanks. The sodium hydroxide is processed, stored and then fed to hydrogen-oxygen fuel cells. The stored hydrogen and oxygen are fed to the hydrogen-oxygen fuel cells, thereby generating direct current which is then inverted to form alternating current. The alternating current is fed into the alternating current power grid for distribution to power consumers. The chlorine is used as a fuel oxidant or may be utilized in water processes. The carbon dioxide is used in refrigerant and other processes.

4 Claims, 4 Drawing Figures

ELECTRICAL POWER GENERATION AND STORAGE SYSTEM

BACKGROUND OF THE INVENTION

This is a continuation-in-part of copending application Ser. No. 534,587, filed Dec. 19, 1974, now abandoned and titled Electrical Power Storage System.

This invention relates to an electric power generation, conversion, and storage method and apparatus which utilizes electro-chemical, chemical, and electro-mechanical mediums for the processes involved.

In the process of generating electric power by conventional power generating systems, e.g., hydro-electric, steam turbine, gas turbine, diesel, or gas engine systems, each system, if operated at a constant power level, operates inefficiently during periods because of variable load factors typically encountered. For example, the load factor may vary, in a typical household, from 100 watts per hour between midnight and 5:00 A.M. to 25,000 watts per hour between 6:00 A.M. to 9:00 A.M. and 3:00 P.M. to 7:00 P.M. The load factor in a commercial office building may vary from 10,000 watts per hour between 6:00 P.M. to 8:00 A.M. and increase to 100,000 watts per hour between 8:00 A.M. to 6:00 P.M. As is known in the art varying conditions cause load factors which vary not only on a daily basis but also on a seasonal basis. In the case of the typical household, it would require a 25,000 watt generator running 24 hours a day to produce the necessary power to meet the relatively short duration peak loads as well as minimum loads which typically exist for a longer period of time, thus producing a total of 600,000 watts in 24 hours. However, the typical household utilizes less than a total of 200,000 watts in this 24 hour period. Due to these varying load factors, all sources of power generation, whether large megawatt generators or smaller on site generators, have periods in which the demand is for the total generating capacity followed by periods of surplus generating capacity. If the surplus energy could be efficiently stored, the peak power generating capacity and/or spinning capacity could be reduced thereby reducing the capital equipment and fuel required to generate a given amount of electricity. In the alternative, the power generating equipment used to meet peak demand would operate only during the relatively short peak demand intervals with the excess power generated being stored, then utilized during other non-peak demand intervals.

It is known that storage batteries of many types, e.g., lead-acid types commonly used in vehicles, are a means of storing electrical energy with a typical optimum efficiency of 72% during surplus generating capacity periods, and then delivering stored power with typical optimum efficiency of 72% during peak demand periods to supplement total generation capacity at a net efficiency of about 51.8%, or to provide power during shut down periods of the power generator.

It is also known that silicon power rectifiers, for converting alternating current to direct current, for charging batteries; and silicon power inverters for converting direct current to alternating current for utilizing batteries in alternating current systems, are being utilized in such systems, each with efficiencies of about 95%. Further, electrolysis cells of many types are utilized in the production of various gases, liquids, and solids at efficiencies of from 95.5 to 96.5%.

Fuel cells of several types and hydrogen-oxygen batteries have been developed which are utilized in the conversion of gases to generate direct current electricity with efficiencies which range from 60% up to as high as 98%. Further, hydrogen reform process plants have been developed which are utilized to produce high purity hydrogen at efficiencies of 40% when fired directly by fuel gas, and can produce high purity hydrogen at greater efficiencies with external steam supply.

In view of the foregoing, it is an object of this invention to provide a process that will utilize generated electrical power which is generated more efficiently utilizing environmentally acceptable methods.

It is another object of this invention to provide a process that will store electric power generated by large public utility generators, or smaller on site electrical power generation systems, more efficiently than conventional storage batteries.

It is another object of this invention to provide a process for converting electric power to gases, liquids, and solids, and then reprocess those gases, liquids, and solids to generate electric power.

It is another object of this invention to provide a process that can utilize excess process steam for converting and storing gases, liquids, and solids, and then reprocess those to gases, liquids, and solids to generate electric power.

It is another object of this invention to provide a process for the enrichment of fuels used in the primary power generating source.

It is another object of this invention to utilize the by-products of the aforementioned processes to increase the efficiency of the power generating cycle of plants or total energy systems utilizing hydro-electric, solar, nuclear, and fossil fuels.

SHORT STATEMENT OF INVENTION

Accordingly, this invention relates to a process for generating and temporarily storing generated electrical energy during periods of less than peak demand in the form of electro-chemical chemical and electro-mechanical mediums. As the demand for electrical energy increases, the stored energy is reconverted back to AC electrical energy for utilization by consumers. In the process alternating current from the power source is rectified to direct current. The direct current powers a chlorine-sodium hydroxide electrolysis cell. Hydrogen produced by the cell is fed to hydrogen-oxygen fuel cells. Sodium hydroxide produced by the cell is fed to the hydrogen-oxygen fuel cells for use as an electrolyte therein. Chlorine produced by the cell is stored and used for water treatment and as a fuel cell oxidant. Alternating current, fuel, and process steam from the power source are fed to a hydrogen reform process plant. Hydrogen from the hydrogen reform process plant is fed to the hydrogen-oxygen fuel cells. Carbon dioxide from the process tank is used for refrigeration and other process or processes as desired. Processed steam from the power source is fed to steam turbine compressors for compressing the chlorine, hydrogen, carbon dioxide, and air to liquid for extraction of its oxygen therein. The oxygen is fed to the hydrogen-oxygen fuel cells. Output direct current from the hydrogen-oxygen fuel cells is inverted to form an alternating current which is fed into the power distribution system for consumption.

In another embodiment of this invention, the aforesaid process is utilized, with the exception of the chlorine-sodium hydroxide electrolysis cell producing electrolyte for the hydrogen-oxygen fuel cells, wherein the electrolyte is obtained from external sources.

In another embodiment of this invention, the aforesaid process is utilized, with the exception of the hydrogen process plant. A power generator supplies process steam required for compression of chlorine and hydrogen gas, and electricity for chlorine-sodium hydroxide electrolysis cell.

In another embodiment of this invention, the aforesaid process is utilized, with the exception of the power source and distribution and the chlorine-sodium hydroxide electrolysis cell. The hydrogen reform process plant generates process steam and electricity required for hydrogen gas conversion and air compression for oxygen gas. Sodium hydroxide electrolyte for hydrogen-oxygen fuel cells is obtained from an external source.

BRIEF DESCRIPTION OF DRAWINGS

Other objects, features and advantages of the present invention will become more fully understood from the following detailed description of the preferred embodiment, the appended claims and the accompanying drawings in which:

DETAILED DESCRIPTION OF THE PREFERRED EMBODIMENT

Throughout the detailed description of the embodiments of the present invention, like numerals will correspond to like elements in the figures.

Figure 1:
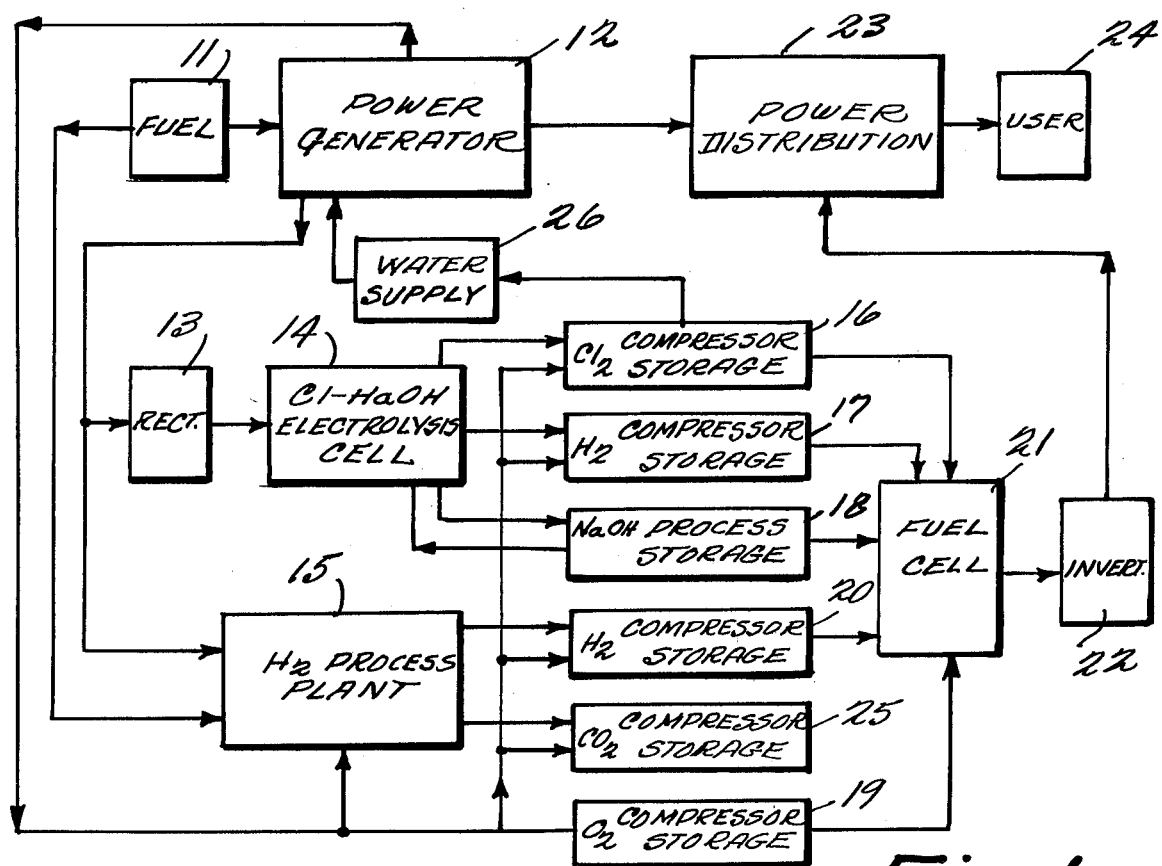
FIG. 1 is a block diagram of the preferred embodiment of the electrical power generation and storage system of the present invention.

Refer now to FIG. 1 where there is disclosed a block diagram of the preferred embodiment of the present invention. A fuel source 11 provides fuel to an electric power generator 12 which may be of the hydro-electric, solar, nuclear, or fossil fuel type. The AC output of the power generator 12 is coupled to a power rectifier circuit 13 which may, for example, include conventional silicon power rectifiers. The DC output of the power rectifier circuit 13 is coupled to a chlorine-sodium hydroxide electrolysis cell 14 of conventional design and suitable capacity. The rectified current sustains the electrolysis in cell 14 and converts saline water or brine to chlorine, hydrogen, and sodium hydroxide. The hydrogen may be stored in compressor storage tank 17, the chlorine in compressor storage tank 16, and the sodium hydroxide in storage and process tank 18. It should be understood that while storage tanks are utilized in the preferred embodiment, the products of electrolysis and reform processes in the hydrogen process tank 15, such as hydrogen and sodium hydroxide, can be directly coupled to a hydrogen-oxygen fuel cell 21 of conventional design for generating a direct current therein. The sodium hydroxide is processed and coupled to the fuel cell 21. In addition, the sodium chloride extracted from the sodium hydroxide tank by dehydration is coupled back to the electrolysis cell 14. The hydrogen is compressed and coupled to the fuel cell 21, or fed to hydrogen process plant 15 for enrichment. The chlorine is stored and used in water treatment processes in power generator 12 and hydrogen process plant 15 or as oxidant in fuel cell 21.

Process steam from the power generator 12 and fuel from fuel source 11 are fed to hydrogen process plant 15. In a two stage catalytic process in the hydrogen process plant 15, a volume product, approximately equal to that of the steam and fuel processed, is produced containing hydrogen and carbon monoxide. The hydrogen from the hydrogen process plant 15 is compressed and stored in tank 20. The carbon monoxide is reprocessed forming carbon dioxide which is used for refrigeration in the oxygen system. The hydrogen from tank 20 is fed to fuel cell 21. Process steam from power generator 12 is fed to steam turbine compressors in chlorine tank 16, hydrogen tanks 17 and 20, oxygen tank 19, and carbon dioxide tank 25. Oxygen is taken from liquid air compressed by steam turbine in compressor tank 19. Oxygen from tank 19 is fed to fuel cell 21.

The output of the fuel cell 21 is inverted by an inverter 22 of conventional design and may be utilized directly by a consumer or may be stepped-up and coupled to the electrical power distribution grid 23 for distribution to consumers. As illustrated, in FIG. 1, the fuel source 11, the electric power generator 12, the electric power distribution grid 23 and consumer block 24, represent existing electrical power generating and distribution systems to the consumer, utilizing any existing form of electrical power generation such as hydroelectric, steam turbine, gas turbine, diesel, or gas engine, fired by solar, nuclear, or fossil fuels.

The heart of the system for electrical power storage includes the power rectifier 13, which preferably of the silicon type. Silicon rectifiers have higher efficiencies, e.g., 95% at 100% load at 250V with a rating of 1000 KW., lower installed cost, and less maintenance than rotary converters. The chlorine-sodium hydroxide electrolysis cell 14 is of conventional design similar, e.g., to the GLANOR cell utilized by Pittsburgh Plate Glass, Inc. These cells typically operate at 3.6 volts at current efficiencies in the range of 95 to 97%. The fuel source 11 is fossil type, preferably methane. The hydrogen process plant 15 is the reformer type similar, e.g., to the DEMARKUS Packaged Hydrogen Plants. These plants are capable of operating at efficiencies in excess of 40% when utilizing methane. With modifications these plants may utilize process steam from any external source for reforming which will improve the efficiency of hydrogen production considerably. The chlorine and hydrogen compressors and tanks 16, 17, and 20 are conventional steam turbine type units designed for required capacity. The oxygen plant is of conventional design similar to a Demarkus unit designed to required capacity. The sodium hydroxide processing and storage tank 18 is a conventional unit designed for required capacity. The hydrogen-oxygen or chlorine cell or battery 21 operates at efficiencies varying from 60 to 98% under varying conditions and material construction. The power inverter 22 includes silicon rectifiers in an inversion configuration for converting DC current to AC. The ratings and efficiencies are the same as the power rectifier 13.

In operation a supply voltage from the alternating current power source 12 is fed to the power rectifier circuit 13. The power rectifier circuit 13 includes a step down transformer which converts the high voltage output of the generator 12 to a relatively low voltage. This voltage is then rectified to provide a direct current which preferably is in the range of, e.g., 3.6–3.75 volts, which is the typical operating range of the electrolysis cell 14. In the event the supply voltage is direct current, the power rectifier circuit 13 is by-passed, and the DC voltage stepped down to the desired voltage range by suitable means known in the art. The desired voltage, i.e., 3.6–3.75 volts at the desired current level, depending on size of cell, is fed to chlorine-sodium hydroxide electrolysis cell 14. At the same time saline water, or brine, is pumped into the cell. Electrolysis then takes place and chlorine is formed at the cell anode while hydrogen is released at the cell cathode, leaving a 10–15% sodium hydroxide solution and a 10–15% sodium hydroxide solution and a 10–15% sodium chloride solution in the cell liquor. The chlorine is compressed in the storage tank 16. It is then used for processing, such as water treatment and as a fuel oxidant. The hydrogen is compressed in the storage tank 17. The hydrogen is then used as a fuel enriching supplement for the fuel cell 21 or for the primary fuel supply 11, if desired. The cell liquor, which includes sodium hydroxide and sodium chloride, is fed to storage-processing tank 18 where it is 50% evaporated, leaving sodium hydroxide which is pumped to the fuel cell 21. The sodium chloride is crystallized, processed, and fed back to cell 14 or utilized for alternate processes.

Fuel 11, AC current and process steam from power generator 12 are fed to hydrogen process plant 15. Approximately one unit volume of fuel gas and three unit volumes of steam are fed past a catalyst in the hydrogen process plant 15. The reaction results in approximately 4 unit volumes of hydrogen to 1 unit of carbon monoxide which is equal to or in excess of the input volume of fuel and steam. The carbon monoxide is recycled within process plant 15 with the hydrogen to form additional hydrogen and carbon dioxide. The carbon dioxide is then used for refrigeration and other processes. The hydrogen is compressed and stored in tank 20. The hydrogen is then fed to the hydrogen-oxygen fuel cell 21 where it is consumed at the negative electrode.

Process steam from power generator 12 is fed to steam turbine compressors in compressor storage tanks 16, 17, 19, 20 and 25. The steam turbine compressor is of the four stage type on oxygen tank 19. Air is liquified, then oxygen is taken off as required and fed to fuel cell 21 where it is consumed in the positive electrode. In the hydrogen-oxygen fuel cell or battery 21, a DC voltage is generated when hydrogen and oxygen from tanks 17, 19 and 20 are combined isothermally via electrodes immersed in sodium hydroxide electrolyte, converting chemical energy released directly to electrical energy. The DC voltage is then fed to power inverter 22 which converts DC voltage to AC voltage.

From the aforementioned it can be seen that the present invention is capable of converting excess process steam to power, when combined with a fossil fuel, during non-peak load intervals by stored chemical or electro-chemical energy in the form of hydrogen, oxygen, and sodium hydroxide, while simultaneously producing chlorine as a valuable processing material or oxidant. The hydrogen, oxygen, and sodium hydroxide can be recombined in a fuel cell to thereby generate electrical energy during periods of peak demand, while the chlorine can be used to treat boiler water or as additional oxidant for the fuel cell.

Figure 2:
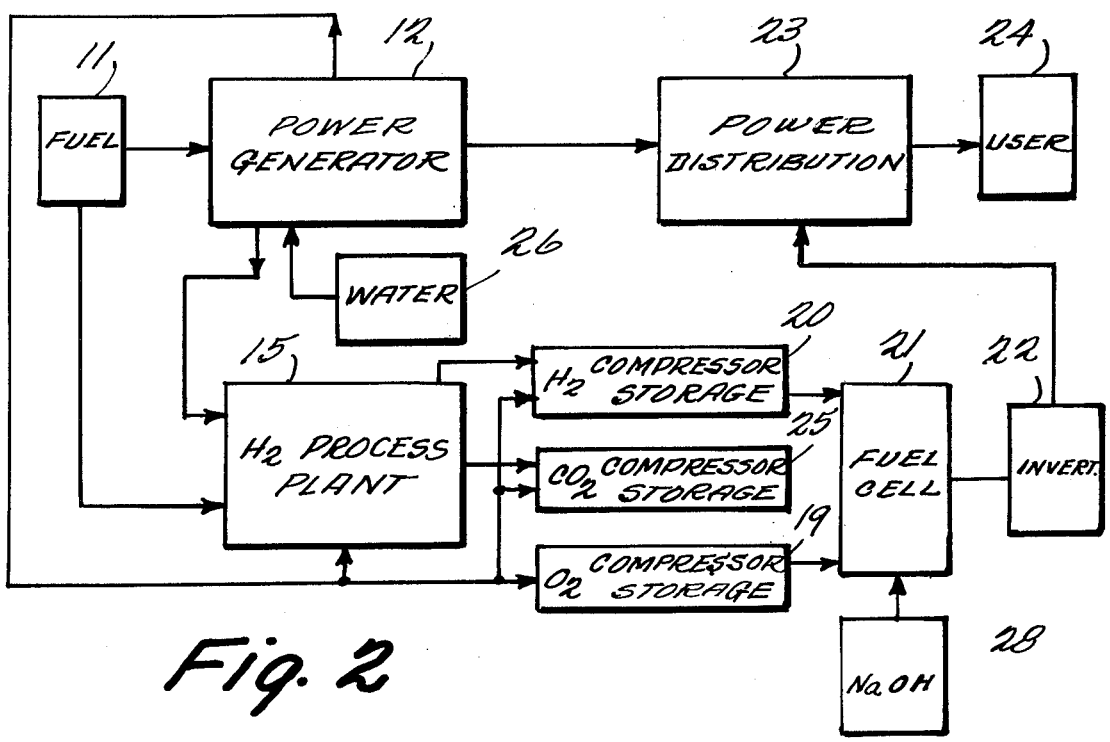
FIG. 2 is a block diagram of an alternate embodiment of the electrical power generation and storage system of the present invention.

Refer now to FIG. 2 which is an alternate embodiment of the present invention. In this embodiment a chlorine-sodium hydroxide electrolysis cell is not provided as in the embodiment of FIG. 1, and accordingly, in order to provide the fuel cell 21 with an electrolyte, sodium or potassium hydroxide is provided from an external source 28.

Figure 3:
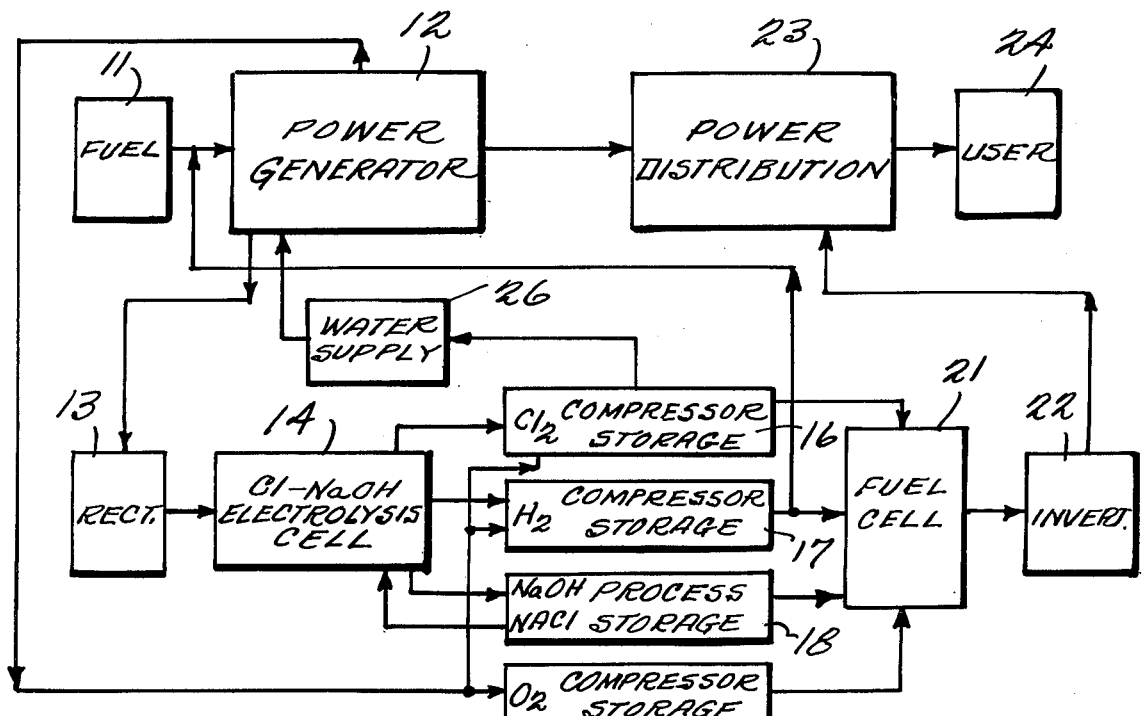
FIG. 3 is a block diagram of an alternate embodiment of the electrical power storage system of the present invention.

Refer now to FIG. 3 which is an alternate embodiment of the present invention. In this embodiment a chlorine-sodium hydroxide electrolysis cell and process steam and electrical power from the power generator are utilized. The hydrogen process plant is deleted. Process steam is utilized by the hydrogen and chlorine compressors. Chlorine is used as the oxidant in the fuel cell or battery and for treatment of water for the power generator. Hydrogen is used as a supplemental fuel.

Figure 4:
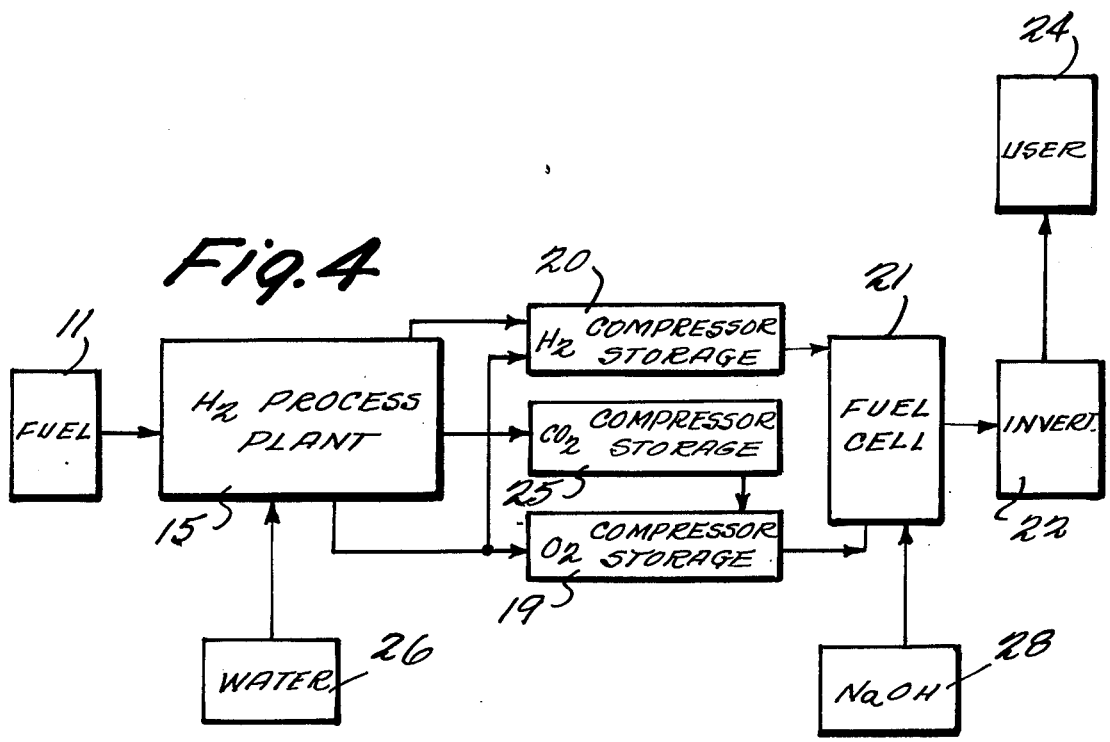
FIG. 4 is a block diagram of an alternate embodiment of the electrical power storage system of the present invention.

Refer now to FIG. 4 which is an alternate embodiment of this present invention. In this embodiment the electric power generation and storage process is operated independently, and the chlorine-sodium hydroxide cell is deleted; utilizing fuel source 11 and generating reform and process steam in the hydrogen process plant. The steam generates electrical power for plant needs as well as powering the steam turbine compressors. Sodium or potassium hydroxide electrolyte are obtained from external source 28.

While the preferred embodiments of applicant's invention have been disclosed, it should be appreciated that there may be other alternate embodiments of applicant's invention which fall within the spirit and scope of the invention as defined by the appended claims.

What is claimed is:

1. In a system for generating and distributing electrical energy and temporarily storing excess generated energy for use during peak demand intervals of the type including power generator means for generating said excess electrical energy; fuel cell means, operative upon oxygen and hydrogen fuel gases and sodium hydroxide electrolyte solution, for selectively combining said fuel gases in said electrolyte to produce electric power upon demand; means responsive to said excess electrical energy for producing said fuel gases; means for storing said fuel gases; and means for applying upon demand said fuel gases to said fuel cell, the improvement wherein said means for producing said fuel gases includes:

electrolysis means, responsive to said excess electrical energy and operative upon a saline-water medium for generating at respective electrodes hydrogen gas and chloride gas and converting a portion of said saline-water medium into a sodium hydroxide solution; and means, responsive to said excess electrical energy, for producing said oxygen fuel gas;

and wherein said system further includes:

means, operative upon said converted saline-water medium, for extracting said sodium hydroxide solution portion, and selectively applying said extracted portion to said fuel cell as said electrolyte.

2. The system of claim 1 wherein said power generator means comprises a steam turbine operative on steam; said means for producing said oxygen fuel gas comprises an air liquifier, said air liquifier utilizing carbon dioxide as a coolant; and wherein said means for producing said fuel gases further comprises:

supplemental hydrogen producing means, operating on said power generator steam, for generating hydrogen and a carbon dioxide by-product, said carbon dioxide by-product being applied to said liquifier as said coolant.

3. A method for storing excess generated electrical energy for use during peak demand intervals comprising the steps of:

applying said excess generated energy to an electrolysis cell operating on a saline-water medium to generate hydrogen gas and to convert a portion of said medium to a sodium hydroxide solution;

extracting said sodium hydroxide solution;

generating, with said excess generated energy, oxygen fluid; and selectively applying to a fuel cell as fuel gases, said hydrogen gas and said oxygen fluid, and applying to said fuel cell as an electrolyte said extracted sodium hydroxide solution.

4. A method for generating excess electrical power during off-peak demand periods and storing such excess power for use during peak demand periods comprising the steps of:

generating steam;

applying said steam to a steam turbine wherein it is at least partially expanded to drive an electrical generator generating excess electrical energy;

applying said excess electrical energy to an electrolysis cell operating on a saline-water medium to generate hydrogen gas and chlorine gas and to convert a portion of said medium into a sodium hydroxide solution;

applying at least a portion of said steam and said excess electrical energy to a catalyst to generate hydrogen gas and carbon monoxide gas;

converting said carbon monoxide gas to hydrogen and carbon dioxide gas;

applying said steam to steam turbine compressors, respectively operative on said hydrogen, said chlorine and said carbon dioxide to provide pressurized stores of hydrogen, carbon dioxide and chlorine;

applying said steam and said carbon dioxide to an air liquifier, to provide a pressurized store of oxygen;

extracting and storing said sodium hydroxide solution; and applying on demand to a fuel cell as fuel gases said pressurized hydrogen and oxygen gases, and applying as an electrolyte said sodium hydroxide solution to controllably convert chemical energy into electrical energy.

* * * * *